Figures 1, 4:
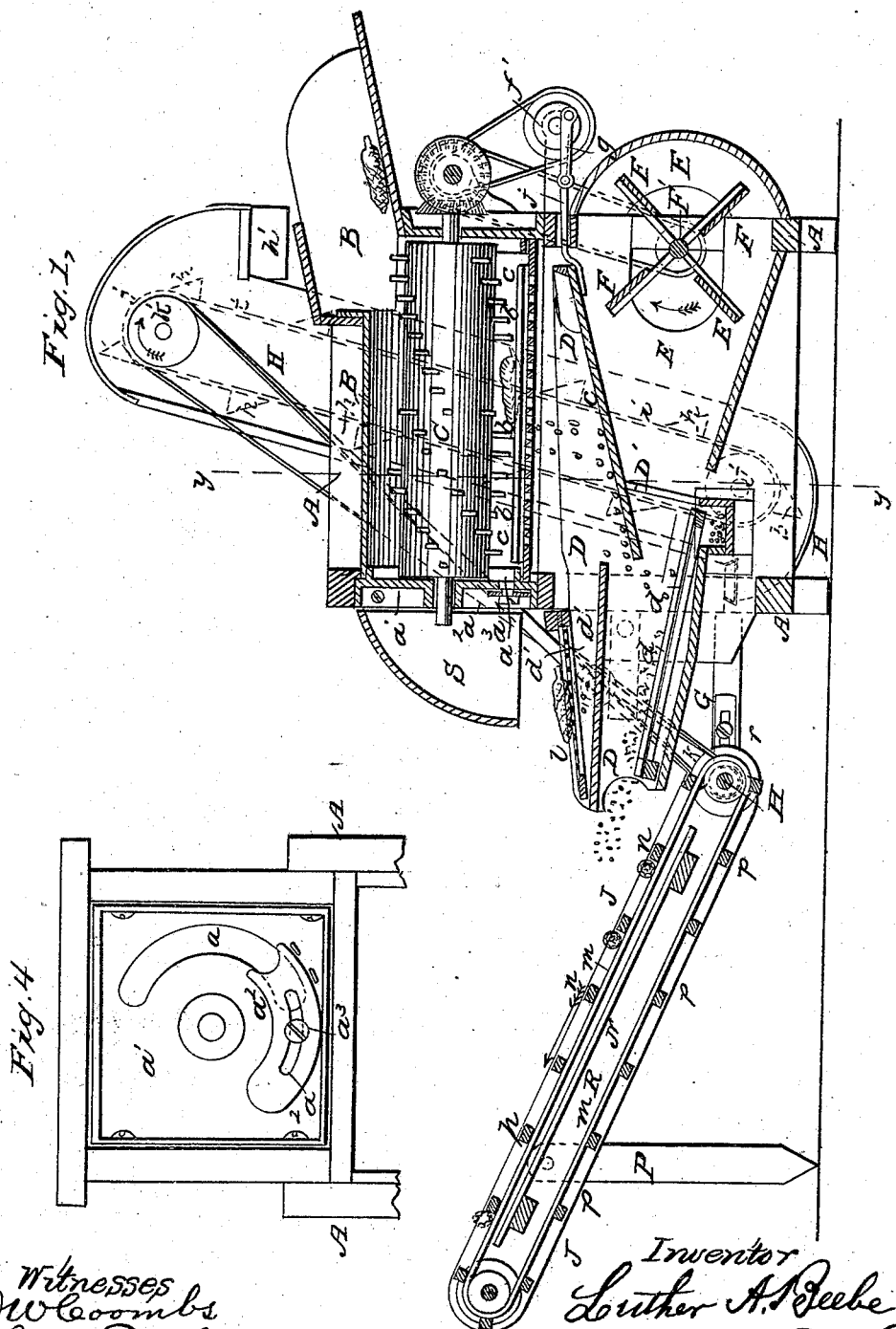

L. A. BEEBE.
Corn Sheller.

2 Sheets—Sheet 1.

No. 36,700.

Patented Oct. 21, 1862.

Witnesses
J W Coombs
G W Reeb

Inventor
Luther A. Beebe
per Munn & Co
Attorneys

L. A. BEEBE.
Corn Sheller.
No. 36,700.
2 Sheets—Sheet 2.
Patented Oct. 21, 1862.
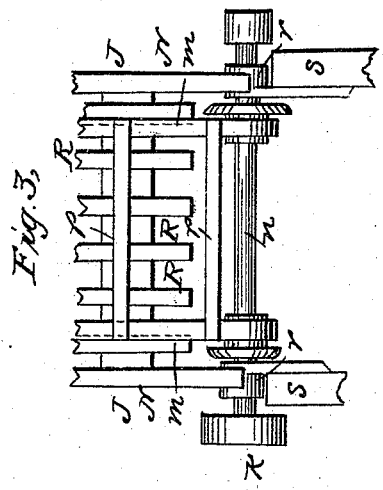
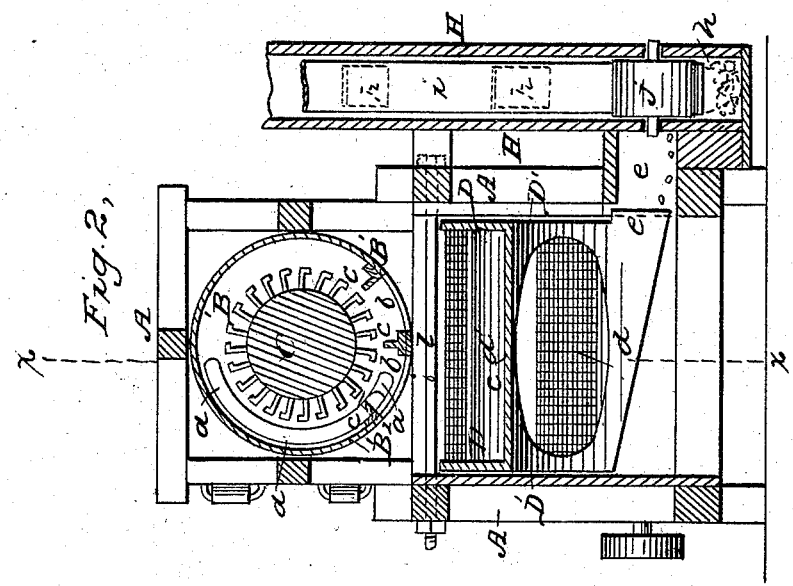
Witnesses
J. W. Coombs
G. W. Reed
Inventor
Luther A Beebe
per Munn & Co
Attorneys

UNITED STATES PATENT OFFICE.

LUTHER A. BEEBE, OF CHICAGO, ILLINOIS.

IMPROVEMENT IN MACHINES FOR SHELLING AND CLEANING CORN.

Specification forming part of Letters Patent No. 36,700, dated October 21, 1862.

*To all whom it may concern:*

Be it known that I, LUTHER A. BEEBE, of Chicago, in the county of Cook and State of Illinois, have invented certain new and useful Improvements in Machinery for Shelling and Cleaning Corn; and I do hereby declare that the following is a full, clear, and exact description of the same, reference being had to the accompanying drawings, making a part of this specification, in which—

Figure 1 is a longitudinal vertical section through the shelling and cleaning apparatus and the inclined cob-carrier. Fig. 2 is a transverse section through Fig. 1 in the vertical plane, indicated by red line $y\,y$ thereon. Fig. 3 shows the lower or receiving end of the inclined cob-carrier. Fig. 4 shows, in an enlarged view, the discharging end of the shelling-cylinder.

Similar letters of reference indicate corresponding parts in the several figures.

To enable those skilled in the art to make and use my invention, I will proceed to describe its construction and operation.

A represents the frame of the machine. B is the hopper, through which the corn in the cob is passed into the shelling apparatus. B' is the cylindrical shell of the shelling apparatus, and C is the shelling-cylinder, which has a series of spiral rows of shelling-teeth or spikes projecting from its surface and extending in spiral lines or rows from one end to the other of this cylinder, which teeth divest the cobs of the corn and at the same time impel the cobs toward one end of the cylinder, where they are discharged through an aperture, $a$, in the head $a'$, as will be hereinafter fully explained.

The bottom of the shell B' is made up of bars which form a grating, $b$, extending from end to end of the shell B', through which grating the grains of corn and chaff escape from the shell as fast as they are separated from the cobs by the teeth on cylinder C. The three narrow plates, which are secured on the inside and across the grating of the shell B', serve as guards to prevent the cobs from being carried around the cylinder C, and also retard their passage or movement. These plates, which are lettered $c\,c\,c$, extend from end to end of the shell B', and are parallel to each other. The grains of corn shelled from the cobs, which escape from the grating $b$, fall on an inclined board, $c$, which board forms a part of the shoe D, and as this shoe is rapidly shaken, as will be hereinafter explained, the corn passes downward, and is discharged from the lower end of board $c$ on an inclined screen, $d$, which is arranged in the rear end of shoe D, as shown in Figs. 1 and 2 of the drawings, so that the grains of corn will all fall on this screen and be passed forward and deposited into the inclined trough $e$. As the grains of corn fall from the lower end of board $c$ on the screen $d$, and while they are passing downward over this screen $d$ to the trough $e$, they will be subjected to a strong blast of air from the fan-box E, which blast is directed from fans F through the opening in board D' over and through the screen $d$, so as to blow off all light substances from the grains through the space at the rear end of shoe D, formed by the inclined boards G and $d'$, as clearly shown in Fig. 1 of the drawings.

The shoe D, containing and supporting the inclined boards $c$ and $d'$, screen $d$, and trough $e$, as above described, is supported on wheels at its rear end, which wheels rest on inclined arms projecting out from the rear end of frame A, as shown in dotted lines, Fig. 1. The front end of shoe D has a rod, $f$, secured to it, which rod passes through a hole in the front end of frame A, over fan-box E, and is connected with an eccentric or crank wheel, $f'$, by means of a pitman-rod, $g$. The shoe D will now receive an upward thrust at each revolution of the eccentric $f'$, which, being repeated very rapidly, tosses up the grains of corn as they pass through the shoe, and thus allows the blast from fan-box E to separate all the extraneous matters from them as they are brought within the influence of this blast.

On one side of the machine, and attached to the frame thereof, is an upright trough, H, containing an endless chain of cups, $h\,h\,h$. The bottom of the trough H is arranged below the mouth or discharge-opening of inclined trough or spout $e$, so that the grains of corn will pass from trough $e$ into the bottom of trough H. Here the corn will be elevated by the cups $h$ to the top of trough H, and, finally, discharged from spout $h'$, to which bags for containing the corn may be attached. The cups $h\,h\,h$ are attached to a suitable belt, $i$, which is stretched over a pulley, $j$, at each end of the trough H. The upper pulley, $j$, is driven by a belt which passes over pulleys $k\,k'$.

As the corn is shelled from the cobs, the cobs are gradually impelled toward the aperture $a$ at the discharging end of the shelling apparatus. This aperture $a$, which is shown in Figs. 1, 2, and 4 of the drawings, is semicircular, and it is made through the head $a'$, its width being nearly equal to the space between the cylinder C and its shell B. $a^2$ is a slotted plate, which is curved, as shown in Fig. 4, and secured over aperture $a$ by a screw, $a^3$, passing through the slot in this plate $a^2$. This plate $a^2$ is arranged between suitable guide-projections cast on the outside of head $a'$, and it is used to regulate the size of the semicircular opening by adjusting it upward or downward, according to the size of the aperture it is desired to leave for the cobs to escape from. By thus regulating the size of aperture $a$ the cobs can be prevented from escaping too rapidly from the shelling apparatus.

The cobs all escape through aperture $a$ and fall on an inclined coarse screen, $l$, under which is the inclined board $d'$. Both the screen $l$ and board $d'$ are supported in shoe D, and they incline in opposite directions, the board $d'$ toward the trough $e$ and the screen $l$ toward the rear end of the machine. The cobs will therefore pass off at the lower end of the screen, while the grains of corn, which might escape with the cobs on screen $l$, will pass through this screen, fall on board $d'$, and be discharged from the lower end of this board on the screen $d$, toward and within the influence of the blast from the fan-box E.

J represents the cob-carrier, which receives the cobs as they fall from screen $l$, and conducts them upward and discharges them into a wagon or any suitable receptacle placed under the highest end of this carrier to receive them. Said carrier consists of continuous belts $m\,m$, which pass around the transverse shafts $n\,n'$ at each end of an inclined frame, N, which is supported at its rear end on props P P. To the belts $m\,m$ strips or lugs $p$ are secured. The frame N is suitably connected at its lower end to the shaft $n'$, so that the opposite or rear end of this frame will be allowed to rise or fall to any desired inclination, and between the carrying-belts are longitudinal strips R, which form a plane on which the cobs are carried upward by the strips $p$. The shaft $n'$, at the lower end of carrier-frame N, has its bearings in adjustable brackets $r$, which are secured to arms $s$, projecting out from the rear end of frame A, as shown in Fig. 1, and this shaft $n'$ receives a rotary motion from fan-shaft F', through belts and pulleys, and operates the endless cob-carrier, moving it in the direction indicated by the arrow in Fig. 1.

The cob-carrier can be given any degree of inclination by moving the lower ends of legs P P outward.

The operation of the entire apparatus is as follows: The corn in the cob is delivered into hopper B from which it is subjected to the shelling operation. The grains escaping between the bars $b\,b$ in the bottom of the shell B, fall on the board $c$, while the cobs are impelled toward the rear or discharging end of the shell B and discharged through the aperture $a$, the size of which should be regulated according to the rapidity of the shelling operation. The grains of corn pass over board $c$ and fall on screen $d$, receiving all the time a shaking or tossing motion from screen $d$. The corn passes down into trough $e$, thence into the bottom of trough H, from whence it is carried up to the upper end of this trough H by the endless chain of cups $h$, and finally discharged from spout $h'$ into a suitable receptacle. The cobs during this operation pass over the screen $l$ and are discharged from this screen on the floor R of the cob-carrier J. The slats $p\,p$ now carry the cobs up the inclined floor R and discharge them from the upper end of this floor R into a wagon or other suitable receptacle, to the height of which the upper end of the carrier can be adjusted by means of the movable legs P P.

The hood S over screen $l$ prevents the cobs which escape from the aperture $a$ from falling off the screen $l$.

Having thus described my invention, what I claim as new, and desire to secure by Letters Patent, is—

1. The semicircular discharge aperture $a$ and the corresponding adjustable plate, $a'$, combined and arranged as set forth for regulating the discharge of cobs from the mill.

2. Combining with the shelling apparatus, constructed as herein described, the shoe D with its inclined boards $c\,d'$ G, screens $l\,d$, and trough $e$, the fanning-mill E F, and elevating-trough H, all arranged and operating as a whole, as and for the purposes herein set forth.

LUTHER A. BEEBE.

Witnesses:
C. D. WOLF,
P. H. HITE.